United States Patent [19]

Krane

[11] 4,400,750

[45] Aug. 23, 1983

[54] SPRING LOADING ARRANGEMENT IN A MAGNETIC READ/WRITE HEAD CARRIAGE ASSEMBLY FOR A FLOPPY DISK DRIVE

[75] Inventor: Jan G. Krane, San Juan Capistrano, Calif.

[73] Assignee: Forestlane Co., Ltd., Tustin, Calif.

[21] Appl. No.: 305,591

[22] Filed: Sep. 25, 1981

[51] Int. Cl.³ .......................... G11B 5/48; G11B 5/54; G11B 17/32; G11B 21/24

[52] U.S. Cl. ..................................... 360/105; 360/99; 360/104; 360/109

[58] Field of Search ................. 360/106, 105, 109, 99, 360/97, 102–104

[56] References Cited

U.S. PATENT DOCUMENTS

| | | | |
|---|---|---|---|
| 3,896,495 | 7/1975 | Beecroft | 360/105 |
| 3,946,439 | 3/1976 | Castrodale et al. | 360/105 |
| 4,151,573 | 4/1979 | Tandon et al. | 360/104 |
| 4,247,877 | 1/1981 | Keller et al. | 360/105 |
| 4,250,530 | 2/1981 | Yang | 360/105 |
| 4,318,144 | 3/1982 | Galvagni | 360/99 |
| 4,323,938 | 4/1982 | Thompson | 360/105 |
| 4,328,521 | 5/1982 | Pexton et al. | 360/99 |

*Primary Examiner*—Alfred H. Eddleman
*Attorney, Agent, or Firm*—Fulwider, Patton, Rieber, Lee & Utecht

[57] ABSTRACT

A magnetic read/write head carriage assembly for a floppy disk drive is disclosed for use with double sided floppy disks which permits the head tracking force to be easily and accurately adjusted. The head carriage assembly comprises a coil spring, having a central coil portion and first and second ends, which is mounted in a position between the base and the head support arm of the carriage assembly with the first end coupled to the base and the second end coupled to the support arm. An adjusting screw is mounted on the base adjacent to the first end of the coil spring for adjusting the position of this end, thereby adjusting the biasing force applied by the spring to the support arm.

8 Claims, 3 Drawing Figures

SPRING LOADING ARRANGEMENT IN A MAGNETIC READ/WRITE HEAD CARRIAGE ASSEMBLY FOR A FLOPPY DISK DRIVE

BACKGROUND OF THE INVENTION

The present invention is directed to magnetic storage devices and, in particular, to a magnetic read/write head carriage assembly for data storage devices using a flexible, doubled-sided magnetic recording medium.

Early magnetic storage devices for data processing systems made use of contact recording. This recording method was superceded to some extent after development of a magnetic head loading assembly in which the head was spaced away from the magnetic surface even during recording operations. This latter arrangement, which is currently used in high speed magnetic "hard disk" storage systems, permits the magnetic head to "fly" on a thin air layer over the recording medium so as to permit intimate interaction between the transducer and the magnetic surface. Contact recording has been used continuously, on the other hand, for less expensive, low speed magnetic storage devices such as magnetic tape and, more recently, floppy disk recording systems.

As is well known, a floppy disk is a rotatable, flexible magnetic disk, normally arranged in a cardboard dust cover. The so-called "floppy disk drive"—namely, a device for reading and recording information on such floppy disks—have come into widespread use for program and data storage because of their relatively low cost and small size notwithstanding a relatively rapid access to recorded information.

In the original floppy disk systems, the transducer structure generally comprised a single magnetic read/write head having a contact surface formed as a segment of a spheroid, or at least in a curved shape. The transducer was mounted on a movable carriage or base so that it could be accessed to different circumferential tracks on a floppy disk. On the opposite side of the disk, and also in contact with the disk was a pressure pad mounted on one end of a spring loaded arm. This arm, which was pivoted at its other end to the carriage base, was controlled by a solenoid to move into and out of contact with the floppy disk to permit data transfer operations to take place. The purpose of the pressure pad on the spring loaded arm was to exert a tracking force through the floppy disk against the single transducer.

Recently, floppy disk drives have been developed for floppy disks on which both sides are used for data storage and transfer operations: the so-called "double-sided" floppy disks. With these drives, a single low speed accessing mechanism continues to be employed but the storage capacity of the device is twice the capacity of a floppy disk drive using single-sided floppy disks. With these improved drives, the pressure pad is replaced by a second magnetic head so that two heads are arranged in a generally opposed relationship on opposite sides of the floppy disk, with only a slight offset in the two head gaps to avoid flux interaction.

This arrangement of opposed magnetic heads on a movable carriage assembly for double sided floppy disks is disclosed, for example, in the U.S. Pat. No. 4,151,573 to Tandon et al. and the U.S. Pat. No. 4,247,877 to Keller et al. These devices use a fixed magnetic head on one side of the floppy disk and a movable magnetic head on the opposite side. The movable head is gimballed on a pivoted, head support arm of low mass and high stiffness and urges the floppy disk against the fixed head with a light force. The force, which is applied by a spring that biases the support arm, is adequate to correct the deflections of the recording surface in a direction normal thereto, although this arrangement requires a slight penetration of the fixed head into the plane of the floppy disk.

The amount of force applied by spring biasing is not "critical;" that is, the floppy disk drive will operate properly provided that the force remains between certain minimum and maximum limits. However, a force which is substantially greater than that required for proper operation results in unnecessary and excessive wear of the magnetic head surfaces and the floppy disk itself.

In the carriage assembly disclosed in both of the above-mentioned patents, the tracking force is produced by a coil spring having a central, coiled portion and two end portions. One of the two end portions rests against the base of the carriage assembly and the other extends outward and applies a force to the head support arm. Neither of these arrangements provide any means for adjusting this spring force.

In the carriage assemblies disclosed in both of the above-mentioned patents the coil spring is located in a position behind and slightly above the head support arm. The spring is therefore exposed and venerable to damage or misadjustment when the magnetic read/write head carriage assembly is removed from the floppy disk drive enclosure for servicing.

SUMMARY OF THE INVENTION

It is a principal object of the present invention to provide a magnetic read/write head carriage assembly for use with double-sided floppy disks, with which the head tracking force may be easily and accurately adjusted.

It is another object of the present invention to provide a read/write head carriage assembly of the type previously described with which the spring providing a biasing force to the head support arm is disposed in a protected location.

These objects, as well as other objects which will become apparent from the discussion that follows, are achieved, according to the present invention, by providing a head carriage assembly which comprises a coil spring, having a central coil portion and first and second ends, which is mounted in a position between the base and the head support arm of the carriage assembly with the first end coupled to the base and the second end coupled to the support arm. An adjusting screw is mounted on the base adjacent to the first end of the coil spring for adjusting the position of this end, thereby adjusting the biasing force applied by the spring to the support arm.

Thus, by locating the coil spring between the support arm and the base, it is out of the way and not susceptable to damage. Since the coil spring is not situated above the support arm, the carriage assembly may have a lower profile than floppy disk carriage assemblies heretofore known in the art and accidental contact with the spring is avoided.

The provision of an adjusting screw permits the biasing or tracking force applied by the "upper" head on the head support arm against the "lower" head on the base to be accurately adjusted. Preferably, this adjusting screw is oriented with its axis substantially parallel to the plane of the floppy disk and to the direction of motion of the carriage assembly with respect to the floppy disk; i.e., the radial direction. With this arrangement, the first end of the coil spring may extend in a direction substantially perpendicular to the plane of the floppy disk so that movement of the adjusting screw results in lateral movement of this first end. The opposite, second end of the spring may extend substantially parallel to the support arm in a position between the support arm and the base, as mentioned above.

According to another, preferred feature of the present invention, the head support arm is provided with an "anchor" which extends downwardly into the region between the support arm and the base. The second end of the spring may be slidably connected to this anchor by passing through a hole therein. With this arrangement, the spring acts through the anchor to pull the support arm in the direction towards the base, rather than by pushing it as in the carriage assemblies disclosed in the above-mentioned U.S. Pat. Nos. 4,151,573 and 4,247,877.

For a full understanding of the present invention, reference should now be made to the following detailed description of the preferred embodiments and to the accompanying drawings.

DETAILED DESCRIPTION OF THE PREFERRED EMBODIMENT

Figure 1:
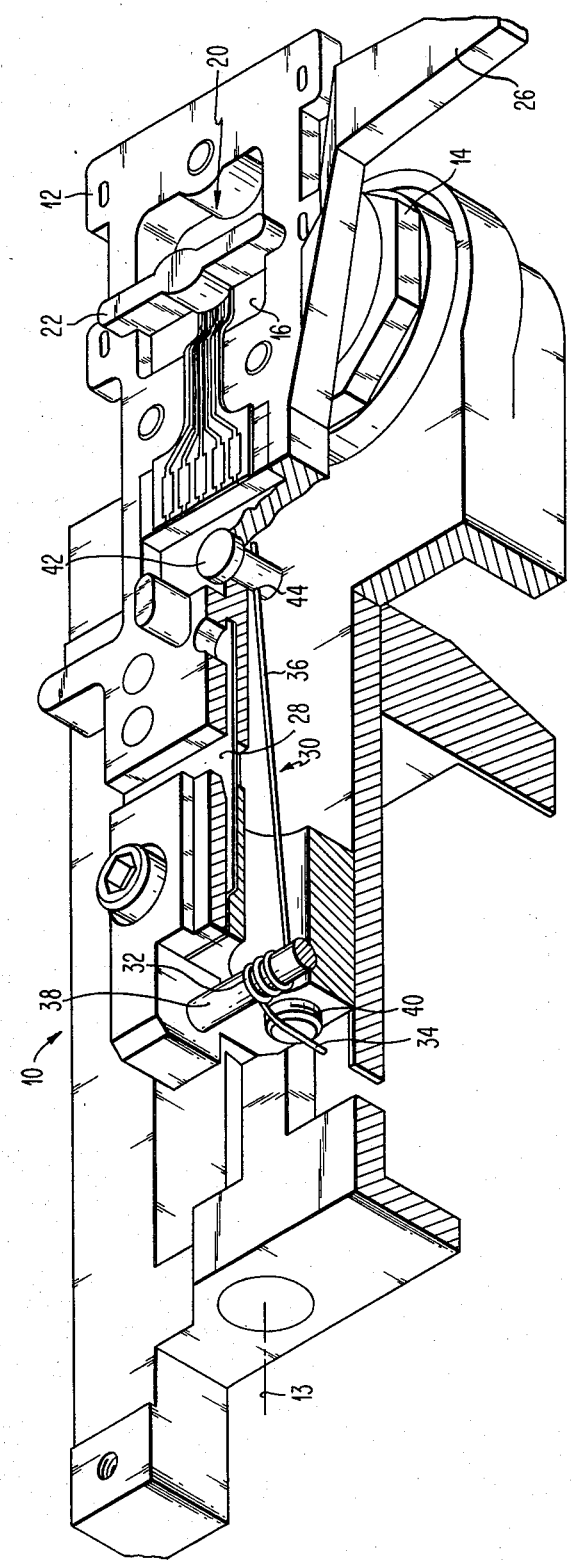
FIG. 1 is a perspective view of a magnetic read/write head carriage assembly for a floppy disk drive, including a carriage base, a head support arm and a spring biasing arrangement according to a preferred embodiment of the present invention.

The preferred embodiment of the present invention will now be described in connection with FIGS. 1-3 of the drawings. Identical elements illustrated in these three figures are designated with the same reference numerals.

Inasmuch as floppy disk drives are widely used, only such parts are shown which directly relate to the magnetic read/write head carriage assembly according to the invention. Reference may be made to the aforementioned U.S. patents as well as to other patents for details of such features as the accessing mechanism and means for inserting or ejecting, respectively, a floppy disk which is also not shown.

Figure 2:
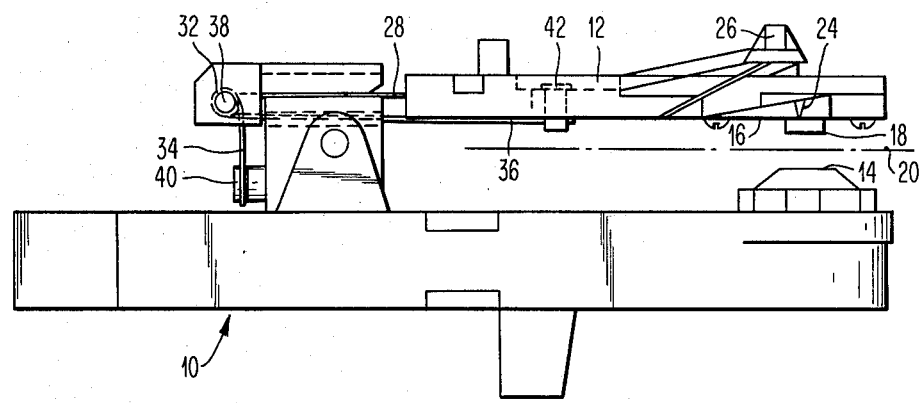
FIG. 2 is a side view of the head carriage assembly of FIG. 1.
Figure 3:
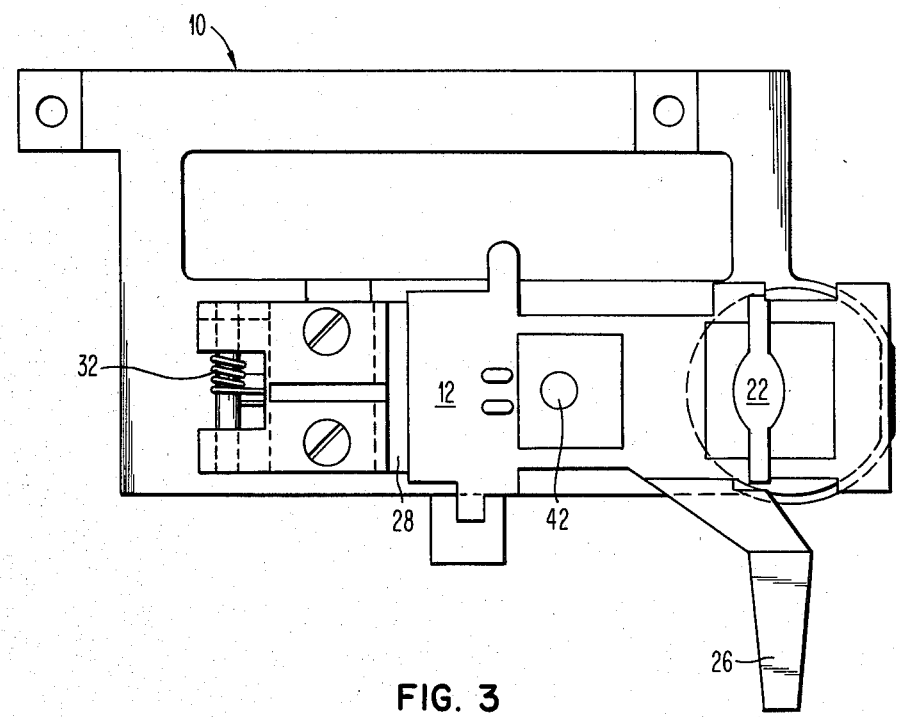
FIG. 3 is a top view of the head carriage assembly of FIG. 1.

The assembly shown in FIGS. 1-3 comprises a base 10 and a head support arm 12 arranged to move within a floppy disk drive along an axis 13. The base 10 carries a "lower," magnetic read/write head 14 in a fixed position. The support arm 12 carries a gimbal 16 on which is mounted an "upper," magnetic read/write head 18 in opposed relationship to the lower head 14. When in the unloaded position shown in FIG. 2, the head support arm 12 is positioned such that the two magnetic heads are spaced apart, permitting insertion of a floppy disk in the plane denoted by the dashed line 20. Through the gimballed mounting, the upper head is able to find its own best position with respect to the floppy disk and fixed lower head 14 when the head support arm 12 is lowered to its operating position under the influence of the head loading, or biasing spring which is described below.

A small aperture in the head support arm 12 is arranged immediately above the gimbal 16 to facilitate gimbal movement and to provide a space for the energizing coils of the upper head 18. A bridge 22 across this aperture terminates in a load point 24 facing in the direction toward the fixed head 14. The load point engages the back of the upper, gimballed head 18 to prevent the gimbal from bowing upward during application of the tracking force against the lower head 14.

Adjacent to the free end of the head support arm 12 is a landing control tab 26. This control tab extends to one side of the support arm 12 and is engageable by a control device such as a solenoid (not shown) to permit automatic pivoting of the head support arm away from the lower head 14 into an unloaded position, or to release the head support arm 12 to permit engagement or "landing" of the upper head 18 on the floppy disk. When in this loaded position the head support arm applies a tracking force to the upper head, floppy disk and lower head which are in successive contact.

At the end opposite the upper head 18, the head support arm 12 is coupled to the carriage base 10 by a hinge spring 28 which permits pivoting movement of the head support arm toward and away from the lower head 14.

According to the invention, the tracking or head loading force is applied to the head support arm 12 by means of a coil spring 30 located in the region between the head support arm 12 and the base 10 so as to maintain a low profile for the carriage assembly and be protected against possible damage by accidental contact. The spring 30 has a coil portion 32, a first end 34 and a second end 36. The coil portion 32 is wrapped around a pivot pin 38 that is rigidly connected to the base and extends in a direction that is parallel with the plane of the floppy disk 20 and transverse to the direction of movement 13 of the base with respect to the floppy disk. The first end 34 of the spring extends downwardly in a direction perpendicular to the plane of the floppy disk 20 and passes over an adjustment screw 40. The second end 36 extends outwardly in a direction substantially parallel to the direction of movement 13 of the base with respect to the floppy disk.

The end 36 of the spring 30 is coupled to the head support arm 12 by an anchor 42. This anchor is a metal dowel-shaped element which extends downward from the support arm toward the base. The end 36 of the spring 30 is slidably inserted through a hole 44 in the anchor 42, thus permitting the end 36 to find its own best position with respect to the anchor 42.

The spring loading arrangement according to the invention permits the tracking or head loading force to be accurately adjusted for optimum operation and minimum head wear. The tracking force may be increased by turning the adjustment screw 42 counterclockwise and decreased by turning it clockwise. In practice, the end 34 of the spring 30 is moved to the right or left of the screw 42 and a screwdriver is inserted in a slot in the head of the screw and rotated to make the adjustment.

There has thus been shown and described a novel magnetic read/write head carriage assembly which fulfills all the objects and advantages sought therefore. Many changes, modifications, variations and other uses and applications of the subject invention will, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

I claim:

1. A magnetic read/write head carriage assembly for a data storage device fow use with a flexible, rotatable magnetic recording disk, said carriage assembly having a base and being movable in a radial direction relative to the recording disk, said carriage assembly comprising, in combination:
   (a) a first magnetic head mounted on said base;
   (b) a head support arm having first and second ends, said support arm being pivotally mounted at said first end thereof with respect to said base such that said second end thereof is movable toward and away from said first magnetic head;
   (c) a second magnetic head mounted on said support arm at the second end thereof;
   (d) spring means, having first and second ends, for biasing said second end of said support arm, and thereby said second magnetic head, toward said first magnetic head, said spring means being mounted in a position between said base and said support arm with said first end thereof being coupled to said base and said second end thereof being coupled to said support arm;
   (e) an adjustment screw mounted in said base adjacent said first end of said spring means for adjusting the position of said first end of said spring means and thereby the biasing force applied to said support arm.

2. The carriage assembly defined in claim 1, wherein said spring means is a torsion spring having a coil portion between said first and second ends thereof, said coil portion having a control axis oriented in parallel with the plane of said recording disk and transverse to said radial direction.

3. The carriage assembly defined in claim 2, further comprising a pivot pin connected to said base and wherein said coil portion of said spring means surrounds said pivot pin.

4. The carriage assembly defined in claim 3, further comprising an anchor, mounted on and extending downwardly from said support arm into the region between said base and said support arm, said second end of said spring means being connected to said anchor for pulling said support arm in the biasing direction.

5. The carriage assembly defined in claim 4, wherein said anchor has a hole therein and said second end of said spring means extends into said hole.

6. The carriage assembly defined in claim 2, wherein said first end of said spring means extends substantially perpendicular to the plane of the recording disk and said second end of said spring means extends substantially parallel to said support arm and to said recording disk.

7. The carriage assembly defined in claim 6, wherein said second end of said spring means is disposed between said support arm and said base.

8. The carriage assembly defined in claim 6, wherein the axis of said adjustment screw is oriented in said radial direction substantially parallel to the plane of said recording disk.

* * * * *

UNITED STATES PATENT AND TRADEMARK OFFICE
CERTIFICATE OF CORRECTION

PATENT NO. : 4,400,750
DATED : August 23, 1983
INVENTOR(S) : Jan G. Krane

It is certified that error appears in the above-identified patent and that said Letters Patent are hereby corrected as shown below:

Column 5, line 8, delete "fow" and insert therefor --for--.

Signed and Sealed this

Seventh Day of February 1984

[SEAL]

*Attest:*

GERALD J. MOSSINGHOFF

*Attesting Officer*     *Commissioner of Patents and Trademarks*